United States Patent
Ota et al.

(10) Patent No.: US 10,879,680 B2
(45) Date of Patent: Dec. 29, 2020

(54) CABLE EXTRA LENGTH ABSORBING STRUCTURE AND BUS BAR MODULE

(71) Applicant: YAZAKI CORPORATION, Tokyo (JP)

(72) Inventors: Michio Ota, Shizuoka (JP); Shinichi Yanagihara, Shizuoka (JP); Yuki Hashimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/005,612

(22) Filed: Jun. 11, 2018

(65) Prior Publication Data
US 2018/0358796 A1 Dec. 13, 2018

(30) Foreign Application Priority Data

Jun. 13, 2017 (JP) .................................. 2017-115628

(51) Int. Cl.
| | | |
|---|---|---|
| H02G 3/00 | (2006.01) | |
| H02G 3/04 | (2006.01) | |
| H01M 2/20 | (2006.01) | |
| H01B 7/00 | (2006.01) | |
| H02G 11/00 | (2006.01) | |
| B60L 50/64 | (2019.01) | |
| H02G 5/02 | (2006.01) | |

(52) U.S. Cl.
CPC ............ *H02G 3/0456* (2013.01); *B60L 50/64* (2019.02); *H01B 7/0045* (2013.01); *H01M 2/202* (2013.01); *H01M 2/206* (2013.01); *H02G 11/00* (2013.01); *H02G 5/025* (2013.01)

(58) Field of Classification Search
CPC ...... H01M 2/206; H01M 2/202; H02G 11/00; H02G 3/0456; B60L 50/64
See application file for complete search history.

(56) References Cited

U.S. PATENT DOCUMENTS 6,168,470 B1 * 1/2001 Ikeda ..................... H01M 2/206
439/620.08
2010/0224403 A1 9/2010 Kosaki et al.

FOREIGN PATENT DOCUMENTS

| JP | 6-83505 U | 11/1994 |
|---|---|---|
| JP | 2010-211962 A | 12/2014 |
| JP | 2014-233159 A | 12/2014 |

* cited by examiner

*Primary Examiner* — Cynthia H Kelly
*Assistant Examiner* — Monique M Wills
(74) *Attorney, Agent, or Firm* — Kenealy Vaidya LLP (57) ABSTRACT

A cable extra length absorbing structure includes a pair of cable clamps. The pair of cable clamps are disposed at a predetermined interval on one side portion of one structural member or one side portions arranged on the same side in two structural members. The pair of cable clamps respectively include cable holding portions arranged on a path in which a cable is configured to be wired. Tach of the cable holding portions includes a holding space. The cable holding portions are disposed in an axis shift state in which a center axis of one holding portion is shifted with respect to a center axis of the other holding portion.

5 Claims, 10 Drawing Sheets

CABLE EXTRA LENGTH ABSORBING STRUCTURE AND BUS BAR MODULE

CROSS REFERENCE TO RELATED APPLICATIONS

This application claims priority from Japanese Patent Application No. 2017-115628 filed on Jun. 13, 2017, the entire contents of which are incorporated herein by reference.

BACKGROUND OF THE INVENTION

Field of the Invention

The present invention relates to a cable extra length absorbing structure and a bus bar module.

Description of Related Art

Figure 10A:
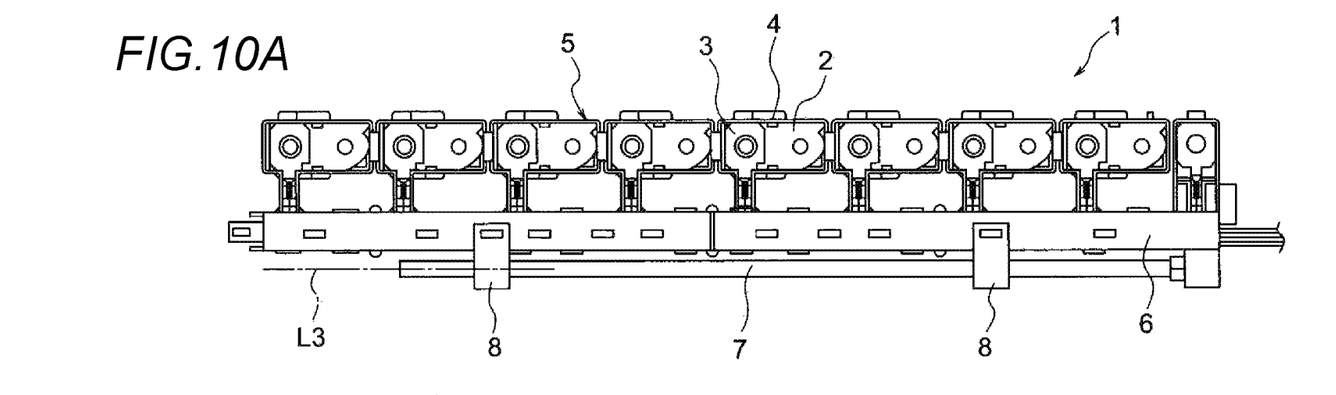
FIGS. 10A and 10B are plan views illustrating a part of a bus bar module of an example of the related art.

In FIG. 10A, a reference sign "1" indicates a bus bar module in the related art (see, for example, the patent document 1: JP-A-2014-233159). The bus bar module 1 is assembled to a battery assembly mounted on hybrid vehicles or electric vehicles. A reference sign "2" in the bus bar module 1 indicates a bus bar having conductivity. A reference sign "3" indicates a voltage detection terminal contacting with the bus bar 2. A reference sign "4" indicates a bus bar accommodation part that houses and fixes the bus bar 2 and the voltage detection terminal 3. A reference sign "5" indicates an insulating resin plate formed by arranging a plurality of the bus bar accommodation parts 4 in a longitudinal direction. In the resin plate 5, a wire housing portion 6 for housing a low voltage electric wire which is connected to the voltage detection terminal 3 and cable clamps 8 for wiring a high voltage cable 7 along the longitudinal direction are formed.

[Patent Document 1] JP-A-2014-233159

Figure 10B:
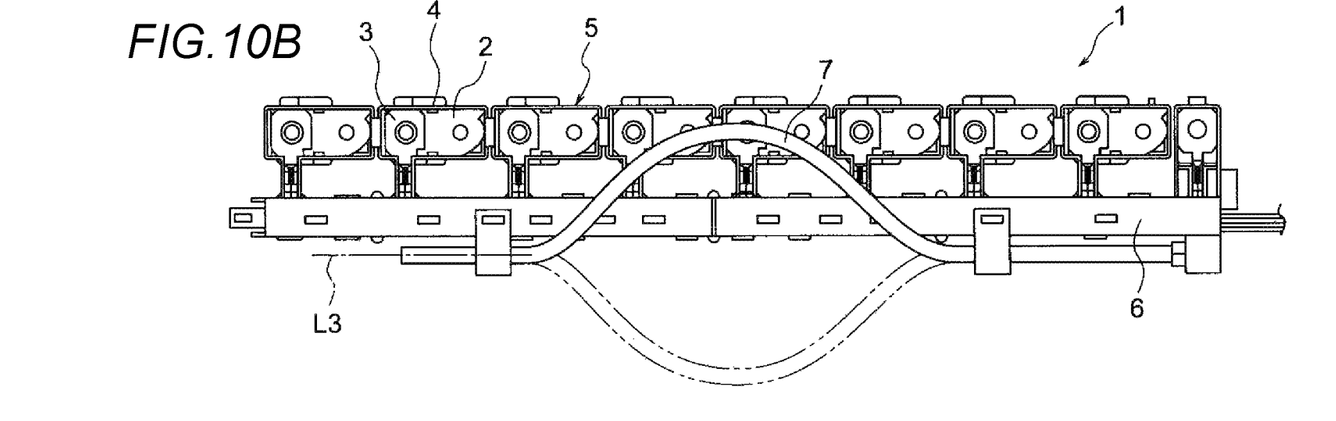

In the above described related art, since a pair of cable clamps 8 in FIG. 10A are arranged so as to be coaxial with an axis indicated by a reference sign "L3", and the bus bar module 1 does not particularly have a structure for absorbing an extra length of the cable 7, there is a problem that, in a case where the length of the cable 7 varies, an unintended cable bent portion 9 having a large deflection width as illustrated in FIG. 10B is generated. When the cable bent portion 9 having the large deflection width protrudes to a side of the bus bar 2 or a side of a peripheral device of the battery assembly, there is a possibility that interference occurs to cause troubles.

The present invention has been made in view of the above circumstances, and an object thereof is to provide a cable extra length absorbing structure and a bus bar module which can absorb variation in cable length by bending a cable in such a state as to reduce a deflection width of a cable bent portion.

In an aspect (1), a cable extra length absorbing structure includes a pair of cable clamps. The pair of cable clamps are disposed at a predetermined interval on one side portion of one structural member or one side portions arranged on the same side in two structural members. The pair of cable clamps respectively include cable holding portions arranged on a path in which a cable is configured to be wired. Tach of the cable holding portions includes a holding space. The cable holding portions are disposed in an axis shift state in which a center axis of one holding portion is shifted with respect to a center axis of the other holding portion.

According to the aspect (1), since the cable holding portions are disposed in an axis shift state in the pair of cable clamps, it is possible to generate a deflection of the cable (a state where a path of the cable is slightly inclined) between the pair of cable clamps. In addition, in a case where there is a variation in the cable length, the cable can be easily bent in a substantially S shape due to the deflection, thereby reducing the deflection width of the cable bent portion as compared to the related art. If it is possible to reduce the deflection width, interference of the cable can be prevented. The cable extra length absorbing structure according to the invention can absorb the variation in the cable length by forming a cable bent portion having a substantially S shape.

In an aspect (2), the cable extra length absorbing structure according to the aspect (1), further comprising:

a hang-down preventing portion preventing the cable from hanging down between the pair of cable clamps disposed at the predetermined interval.

According to the aspect (2), it is possible to prevent the cable from hanging down between the pair of cable clamps so that a variation absorption state can be stabilized.

In an aspect (3), a bus bar module includes a plurality of bus bars connecting adjacent batteries of a battery assembly including a plurality of batteries in series, and an resin plate including a plurality of bus bar accommodation parts which accommodate and fix the bus bars and which are arranged in the longitudinal direction. The resin plate is a structural member in the cable extra length absorbing structure according to claim 1 or 2. The resin plate is provided with the pair of cable clamps having the pair of cable holding portions disposed in the axis shift state in the cable extra length absorbing structure.

According to the aspect (3), since the cable extra length absorbing structure according to the first and second aspects is included, it is possible to absorb the variation in the cable length in the bus bar module.

SUMMARY

According to one or more embodiments, since it is possible to bend a cable in such a state as to reduce a deflection width of a cable bent portion, the variation in the cable length can be favorably absorbed. In addition, since it is possible to bend the cable at a fixed position, the variation of the cable length can also be stably absorbed.

BRIEF DESCRIPTION OF THE DRAWINGS

FIGS. 9A and 9B are views illustrating a disposition example of a pair of cable clamps.

DETAILED DESCRIPTION

A bus bar module includes a plurality of conductive bus bars for connecting adjacent batteries of a battery assembly including a plurality of the batteries in series and an insulating resin plate formed by arranging a plurality of bus bar accommodation parts, which is a destination to be housed and fixed with the bus bar, in a longitudinal direction. The resin plate is a structural member in the cable extra length absorbing structure, and the resin plate as the structural member is provided with a pair of cable clamps. A pair of cable holding portions disposed in an axis shift state are formed in the pair of cable clamps.

Figure 1:
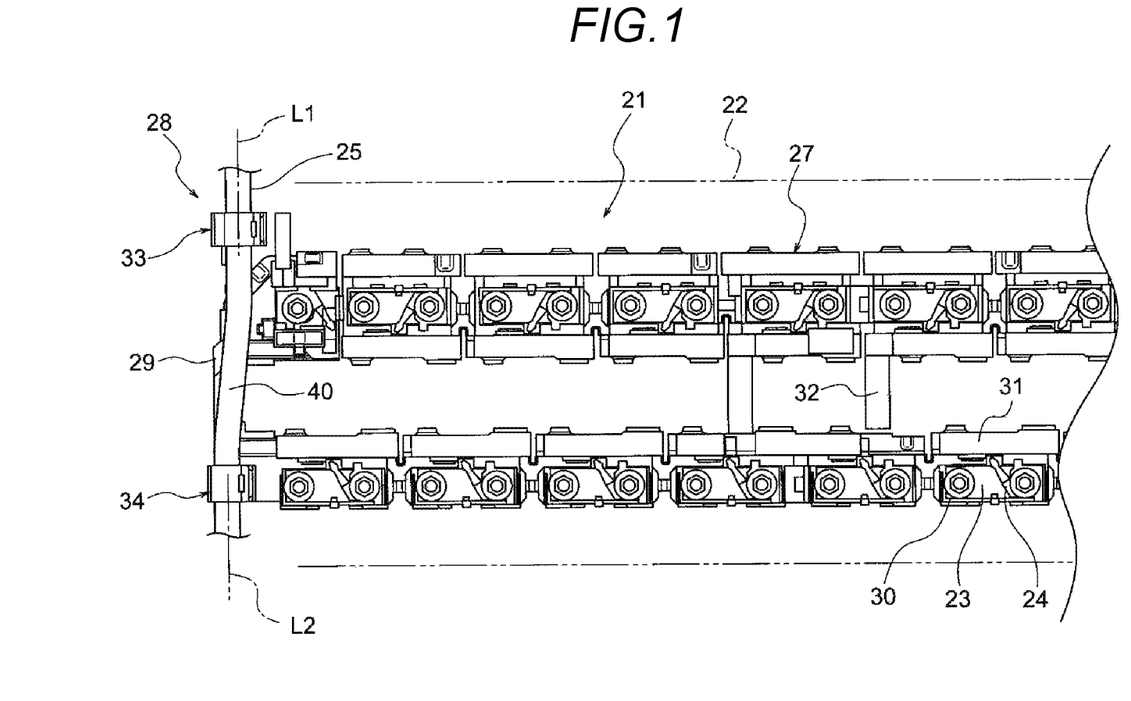
FIG. 1 is a plan view illustrating an embodiment of a cable extra length absorbing structure and a bus bar module of the invention.
Figure 2:
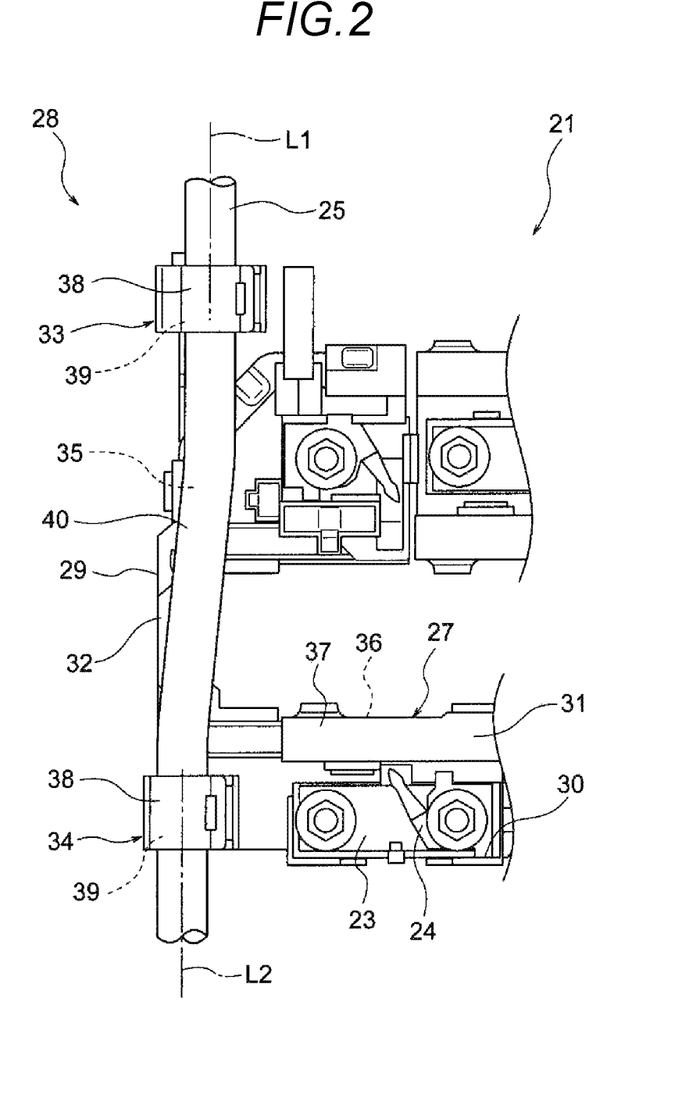
FIG. 2 is an enlarged view illustrating the cable extra length absorbing structure of FIG. 1.
Figure 3:
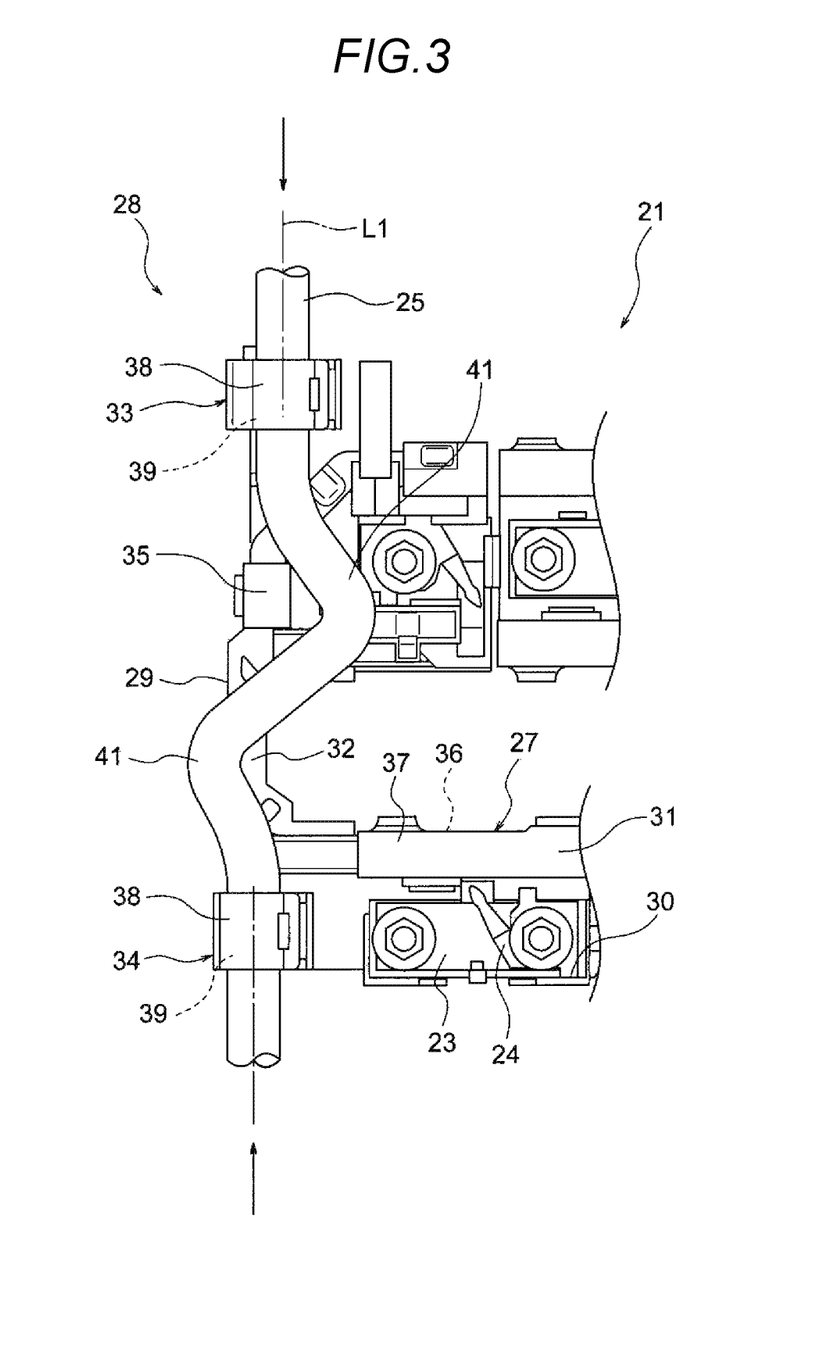
FIG. 3 is an enlarged view illustrating a state in which a variation in a cable length is absorbed relative to FIG. 2.
Figure 4:
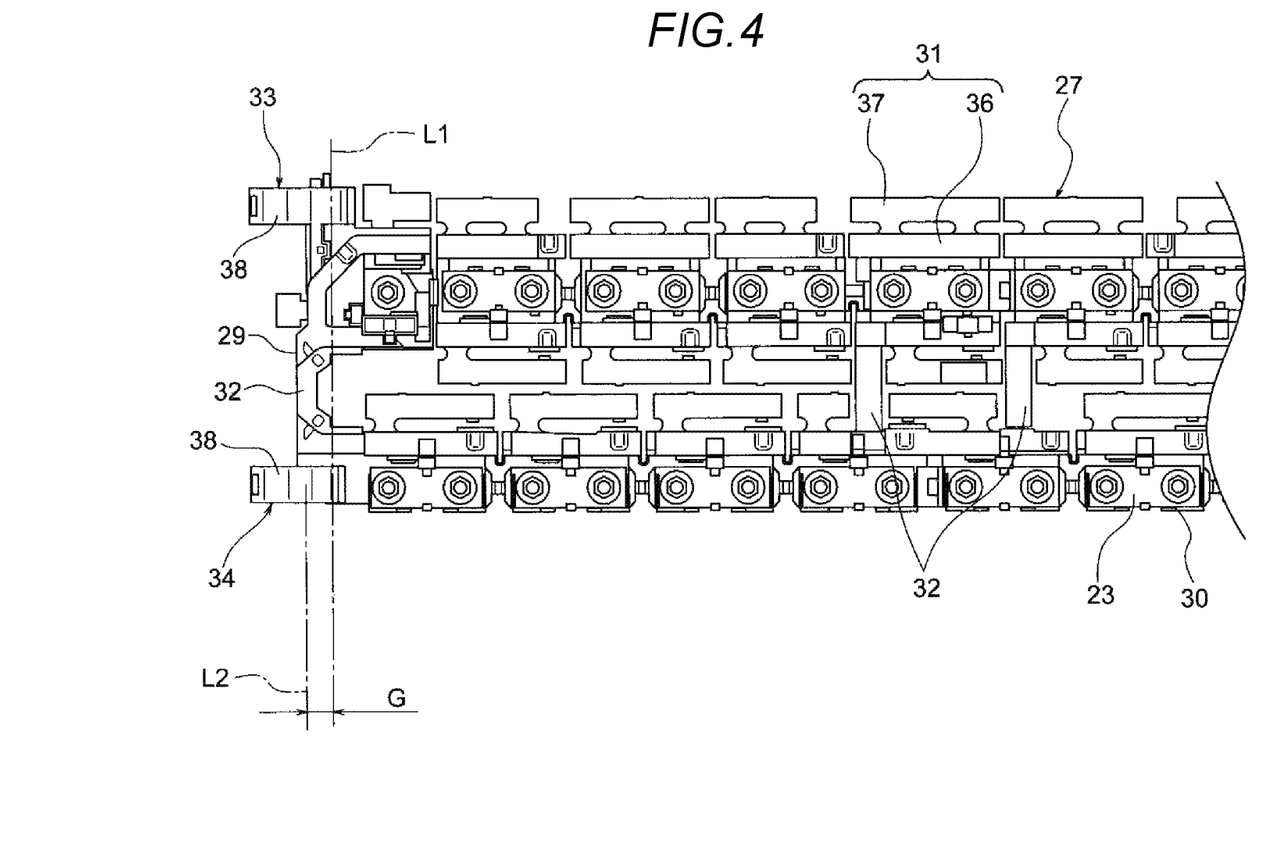
FIG. 4 is a plan view illustrating a resin plate of the bus bar module.
Figure 9A:
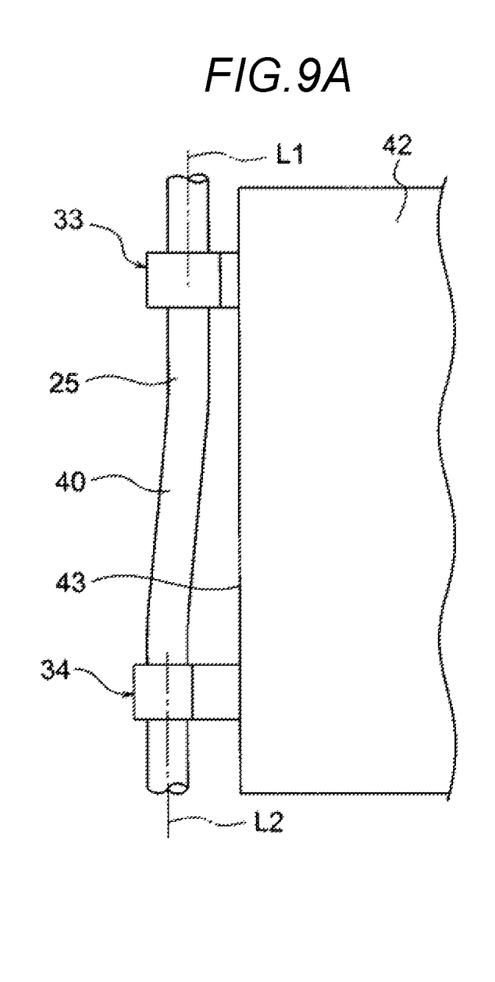
FIG. 9A is a schematic view illustrating an example in which the cable clamps are disposed at a predetermined interval on one side portion of one structural member.
Figure 9B:
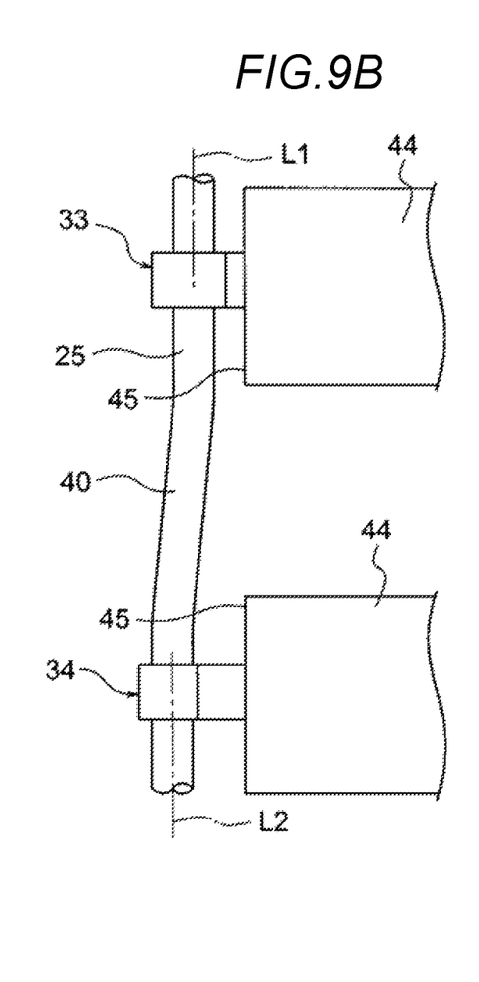
FIG. 9B is a schematic view illustrating an example in which the cable clamps are disposed at a predetermined interval on one side portions arranged on the same side of two structural members.

Hereinafter, examples will be described with reference to the drawings. FIG. 1 is a plan view illustrating an embodiment of a cable extra length absorbing structure and a bus bar module of the invention. In addition, FIG. 2 is an enlarged view of the cable extra length absorbing structure of FIG. 1. FIG. 3 is an enlarged view of a state in which a variation in the cable length is absorbed relative to FIG. 2. FIG. 4 is a plan view of a resin plate. FIGS. 5 to 8 are perspective views of the cable extra length absorbing structure. FIGS. 9A and 9B are views illustrating a disposition example of a pair of cable clamps.

<Regarding Bus Bar Module 21>

In FIG. 1, A bus bar module 21 is assembled to a battery assembly 22 mounted on a hybrid vehicle or an electric vehicle, and includes a plurality of bus bars 23, a plurality of voltage detection terminals 24, a high voltage cable 25, a plurality of low voltage electric wires 26 (see FIG. 6), a resin plate 27, and the like. The bus bar module 21 is characterized in that the resin plate 27 has the cable extra length absorbing structure 28.

<Regarding Bus Bar 23 and Voltage Detection Terminal 24>

In FIG. 1, the bus bar 23 is provided for connecting adjacent batteries of the battery assembly 22 in series. The bus bar 23 is formed by press working a metal plate having conductivity. The voltage detection terminal 24 includes an electric contact portion and an electric wire connection portion, and the electric contact portion is connected to the battery in a state of being overlapped and contacted with the bus bar 23. The voltage detection terminal 24 is formed by press working a thin metal plate having conductivity. A terminal of the electric wire 26 is connected to the electric wire connection portion of the voltage detection terminal 24. The voltage detection terminal 24 is connected to an electronic control unit via the electric wire 26. In the present example, the same bus bar 23 and voltage detection terminal 24 as those in the example of the related art are adopted.

<Regarding Cable 25 and Electric Wire 26>

Figure 6:
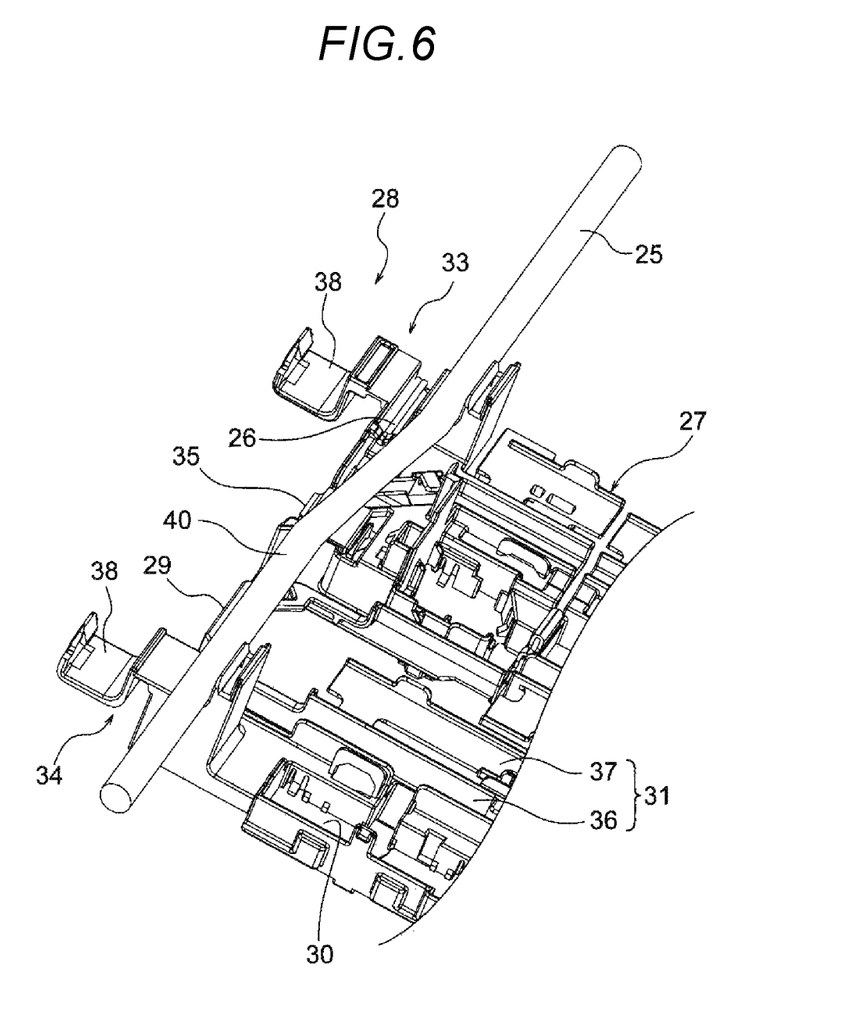
FIG. 6 is a perspective view illustrating the cable extra length absorbing structure (clamp open and with cable).

In FIGS. 1 and 6, the cable 25 includes a conductor (core wire) having conductivity and an insulating insulator (insulation coating) with which the conductor is coated. The cable 25 is a well-known thick electric wire and has flexibility capable of being deflected while having stiffness. In the present example, the cable 25 is wired along a short side portion 29 (one side portion) of the resin plate 27. The electric wire 26 is a well-known thin electric wire and includes a conductor and an insulator. As described above, the electric wire 26 is connected to the electric wire connection portion of the voltage detection terminal 24 to be wired on the resin plate 27. The other end of the electric wire 26 is connected to the electronic control unit as described above. In the present example, the same cable 25 and electric wire 26 as those in the example of the related art are adopted. Note that the "cable 25" may be replaced with "the electric wire 25" or "the thick electric wire 25" (in the case of being replaced, it is necessary to change the title of the invention).

<Regarding Resin Plate 27>

In FIGS. 1 and 4, the resin plate 27 is a relatively large insulating resin formed product assembled to, for example, an upper surface (a surface on which an electrode is provided) of the battery assembly 22, and includes a plurality of bus bar accommodation parts 30, a plurality of wire housing portions 31, a plurality of bridge portions 32, a pair of cable clamps 33 and 34, and a hang-down preventing portion 35. In the present example, the resin plate 27 corresponds to the "structural member" described in the claims.

The plurality of bus bar accommodation parts 30 are disposed to line up along the longitudinal direction of the resin plate 27. The bus bar 23 and the voltage detection terminal 24 are housed in and fixed to each of the plurality of bus bar accommodation parts 30. The plurality of wire housing portions 31 are formed as a housing part of the electric wire 26 connected to the voltage detection terminal 24. Each of the plurality of wire housing portions 31 includes a housing portion main body 36 and a cover portion 37. A wiring path of the electric wire 26 is changed in direction from a side of a short side portion 29 (one side portion) of the resin plate 27 to a side of a cable clamp 33 via the wire housing portion 31 to be withdrawn to a side of an electronic control unit. In the present example, above described parts of the resin plate 27 have basically the same structure as those of the example of the related art.

The plurality of bridge portions 32 are formed as portions connecting a plurality of rows of the bus bar accommodation parts 30 arranged along the longitudinal direction of the resin plate 27. In the bridge portion 32 at a position of the short side portion 29 (one side portion) among the plurality of bridge portions 32, a wiring part of the electric wire 26 and the hang-down preventing portion 35 to be described later are formed. In addition, the cable 25 is wired above the bridge portion 32.

<Regarding Pair of Cable Clamps 33 and 34 and Cable Extra Length Absorbing Structure 28>

In FIGS. 1 to 8, the pair of cable clamps 33 and 34 are used as a cable holding portion when the cable 25 is wired along the short side portion 29 (one side portion). The pair of cable clamps 33 and 34 are disposed at a predetermined interval therebetween. In the present example, the pair of cable clamps 33 and 34 are disposed so as to substantially align with arrangement positions (rows) of the plurality of bus bar accommodation parts 30 (this is an example, and the pair of cable clamps 33 and 34 are disposed on positions at which the cable 25 can be bent in a substantially S shape to be described later). The pair of cable clamps 33 and 34 have a function as the cable extra length absorbing structure 28. The cable extra length absorbing structure 28 is a structure in which the cable 25 can be bent at a fixed position to absorb the variation in the cable length and a structure in which the cable can be bent in a state where the deflection width of the cable bent portion 41 to be described later is reduced to absorb the variation in the cable length.

Each of the pair of cable clamps 33 and 34 includes a cable holding portion 38 disposed on the path of the cable 25 to be wired linearly. Each cable holding portion 38 is formed to have a holding space 39 larger than the diameter of the cable 25 in a cross-sectional view. In other words, the cable holding portion is formed as a portion that can externally fit the cable 25 in a state of having a clearance. Each cable holding portion 38 is disposed in an axis shift state in which a center axis L2 of the holding portion on a side of the cable clamp 34 is deviated with respect to a center axis L1 of the other holding portion on a side of the cable clamp 33 by a dimension G (see FIG. 4).

The "deviation" by the dimension G means "deviation" that can generate deflection 40 of the cable 25 as illustrated in FIG. 2 (a state where the path of the cable 25 is slightly inclined) between the pair of cable clamps 33 and 34 (means not a "slight deviation" such as a dimensional error but a positively shifted "deviation").

<Regarding Hang-Down Preventing Portion 35>

Figure 7:
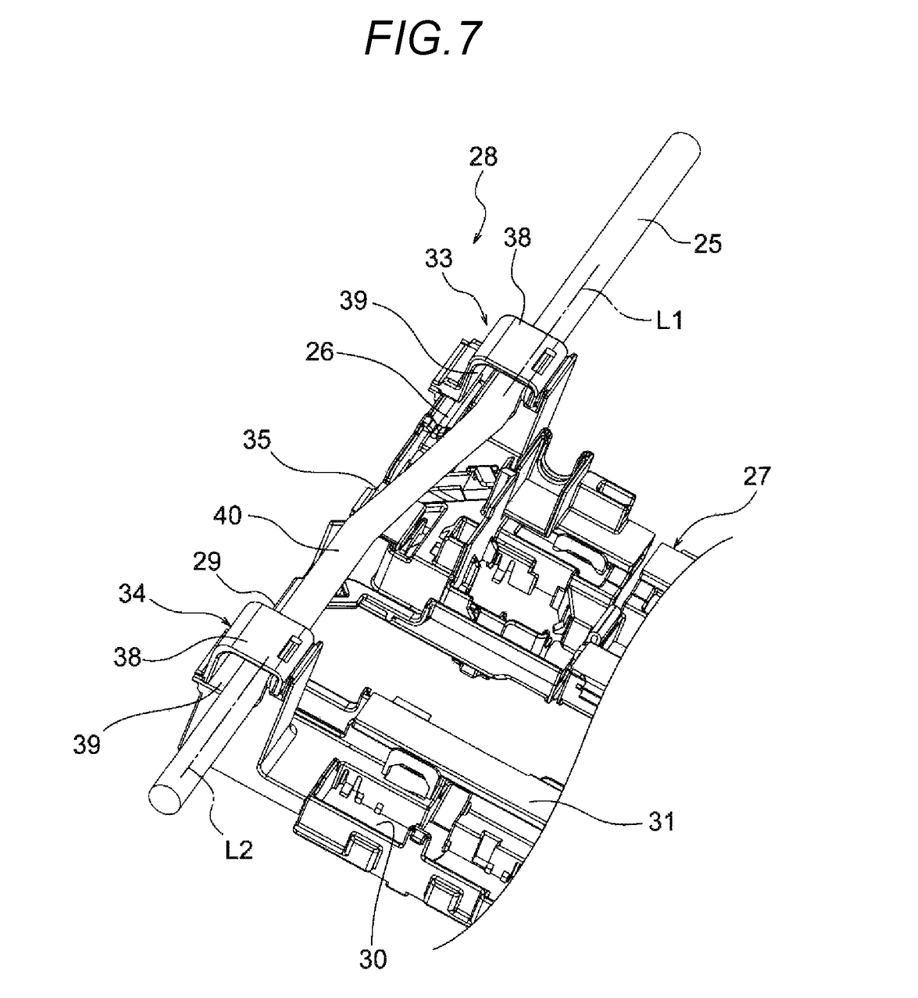
FIG. 7 is a perspective view illustrating the cable extra length absorbing structure (clamp closed).
Figure 8:
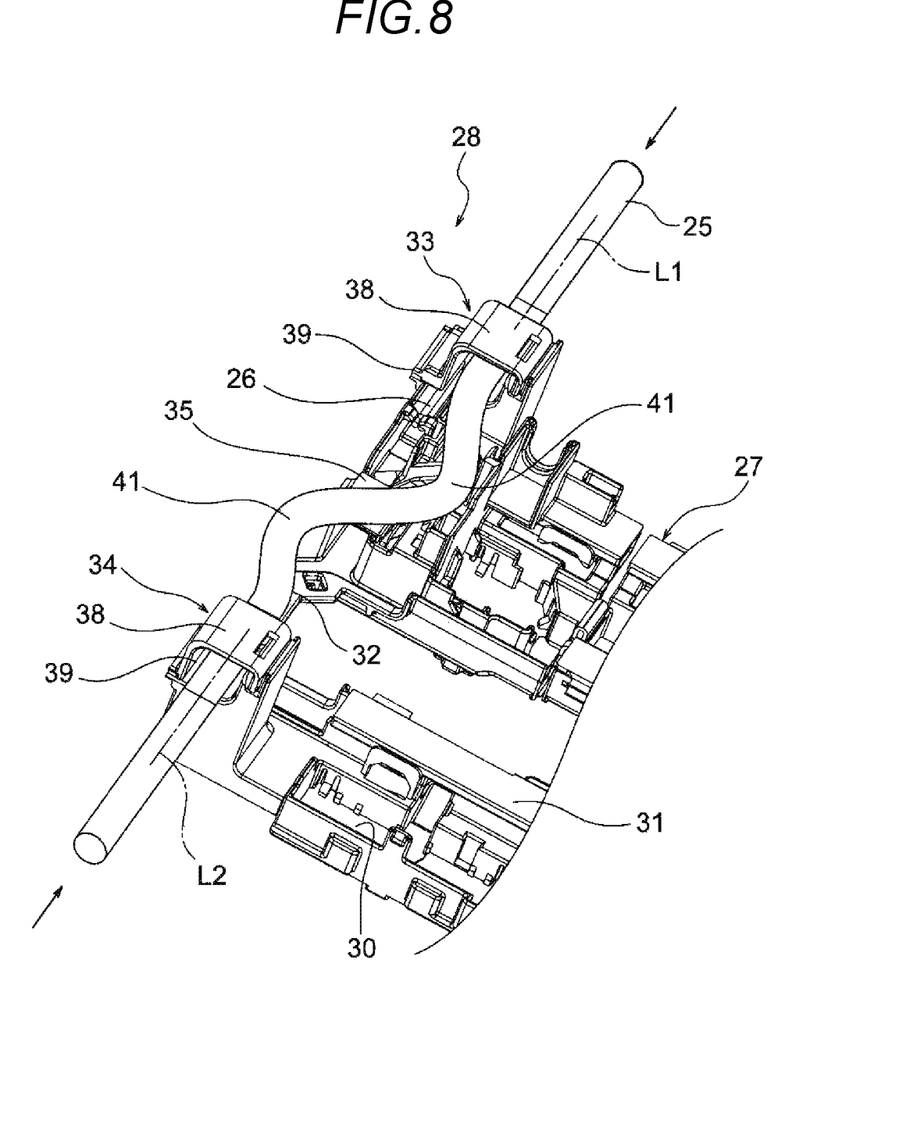
FIG. 8 is a perspective view illustrating the cable extra length absorbing structure (clamp closed and variation absorbed state).

In FIG. 7, the hang-down preventing portion 35 is formed as a support part for preventing the cable 25 from hanging down between the pair of cable clamps 33 and 34. In the present example, the hang-down preventing portion 35 is also formed in a portion having a shape through which the electric wire 26 passes.

<Regarding Wiring of Cable 25>

Figure 5:
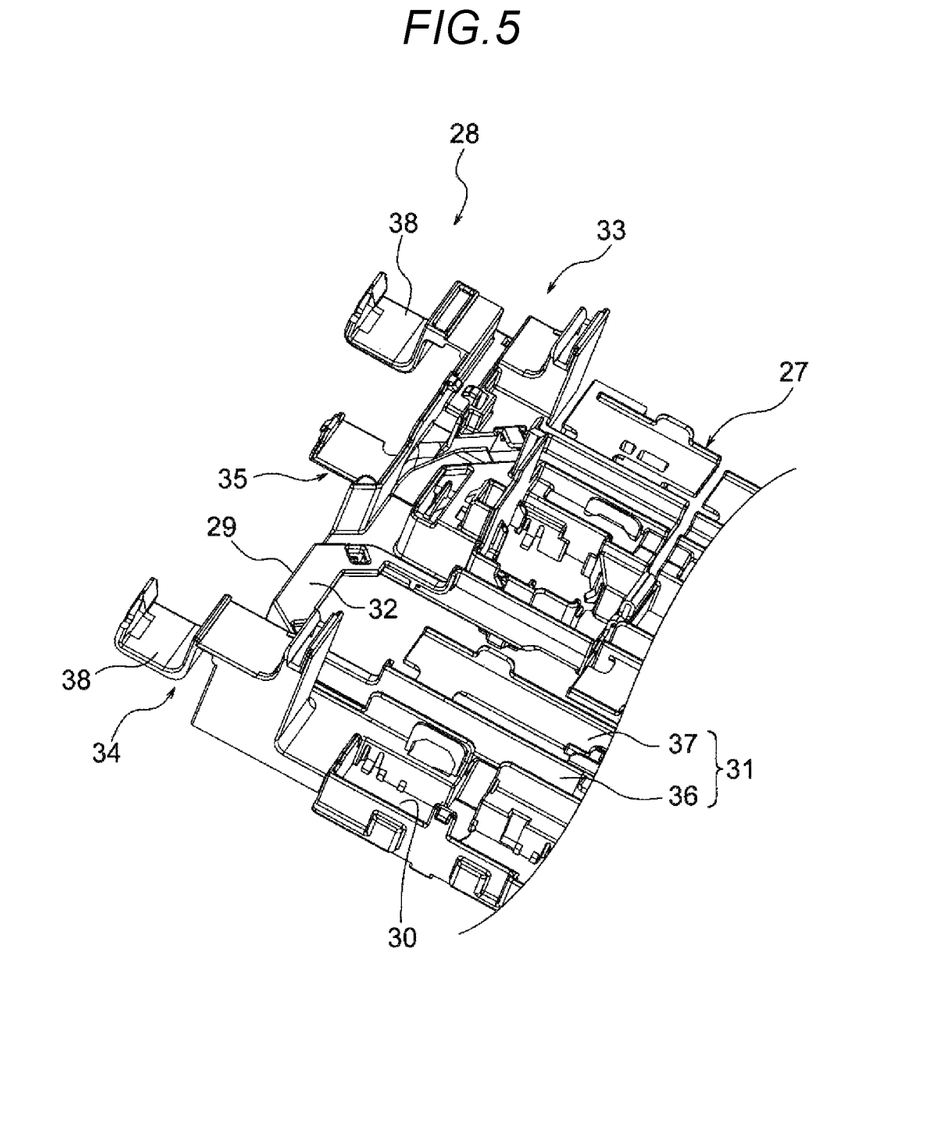
FIG. 5 is a perspective view illustrating the cable extra length absorbing structure (clamp open and no cable).

In FIG. 5, the pair of cable clamps 33 and 34 are opened, and in this state, the electric wire 26 and the cable 25 are wired as illustrated in FIG. 6. Then, when the pair of cable clamps 33 and 34 are closed as illustrated in FIG. 7, the wiring is completed.

<Regarding Operation of Cable Extra Length Absorbing Structure 28>

In FIGS. 2 and 7, in the cable 25, the deflection 40 occurs which causes the path being slightly inclined between the pair of cable clamps 33 and 34. If such a deflection 40 occurs, in a case where there is a variation in the length of the cable 25, the cable 25 can be easily bent in a substantially S shape by the movement as indicated by arrows in FIGS. 3 and 8. That is, it is possible to form the cable bent portion 41 having a substantially S shape. Since the cable bent portion 41 is a substantially S-shaped bent part, it is possible to reduce the deflection width as compared to the cable bent portion 9 (see FIG. 10B) which greatly protrudes on one side like a mountain as in the example of the related art. If it is possible to reduce the deflection width, interference of the cable 25 can be prevented. The cable extra length absorbing structure 28 can absorb the variation in the cable length by forming the cable bent portion 41 having a substantially S shape.

<Regarding Effect of Cable Extra Length Absorbing Structure 28>

As described above with reference to FIGS. 1 to 8, according to the cable extra length absorbing structure 28, which is the embodiment of the invention, since it is possible to bend the cable in such a state as to reduce the deflection width of the cable bent portion 41, the variation in the cable length can be favorably absorbed. In addition, since it is possible to bend the cable 25 at a fixed position, the variation in the cable length can also be stably absorbed.

<Regarding Modification Example of Disposition of Pair of Cable Clamps 33 and 34>

In FIG. 9A, the cable holding portions 38 of the pair of cable clamps 33 and 34 are disposed in an axis shift state. Here, the pair of cable clamps 33 and 34 are disposed at a predetermined interval on one side portion 43 of one structural member 42. Examples of one structural member 42 include various devices (units) and members mounted on a vehicle. Specific examples thereof include an electrical junction box and a panel member mounted on a vehicle. It is also possible to use the resin plate 27 as one structural member 42 and use a side portion in the longitudinal direction of the resin plate 27 as one side portion 43.

In FIG. 9B, the cable holding portions 38 of the pair of cable clamps 33 and 34 are disposed in an axis shift state. Here, the pair of cable clamps 33 and 34 are disposed at a predetermined interval on one side portions 45 of two structural members 44. Examples of the two structural members 44 include a case where there are two battery assemblies 22 to which the resin plate 27 is assembled and the like.

It goes without saying that the invention can be variously modified within a range not changing the gist of the invention.

21: Bus bar module, 22: Battery assembly, 23: Bus bar, 24: Voltage detection terminal, 25: Cable, 26: Electric wire, 27: Resin plate (structural member), 28: Cable extra length absorbing structure, 29: Short side portion (one side portion), 30: Bus bar accommodation part, 31: Wire housing portion, 32: Bridge portion, 33, 34: Cable clamp 35: Hang-down preventing portion, 36: Housing portion main body, 37: Cover portion, 38: Cable holding portion, 39: Holding space, 40: Deflection, 41: Cable bent portion, 42, 44: Structural member, 43, 45: One side portion

What is claimed is:

1. A cable extra length absorbing structure comprising:
   a pair of cable clamps,
   wherein the pair of cable clamps are disposed at a predetermined interval on one side portion of one structural member or one side portions arranged on the same side in two structural members,
   wherein the pair of cable clamps respectively include cable holding portions arranged on a path in which a cable is configured to be wired such that the cable extends from one of the pair of cable clamps to another one of the pair of cable clamps so as to be disposed therebetween when the cable is clamped by the pair of cable clamps,
   wherein each of the cable holding portions includes a holding space,
   wherein the cable holding portions are disposed in an axis shift state in which a center axis of one holding portion is shifted with respect to a center axis of the other holding portion, and
   wherein the center axes are parallel to each other.

2. The cable extra length absorbing structure according to claim 1, further comprising:
   a hang-down preventing portion preventing the cable from hanging down between the pair of cable clamps disposed at the predetermined interval.

3. A bus bar module comprising:
   a plurality of bus bars connecting adjacent batteries of a battery assembly including a plurality of batteries in series; and
   a resin plate including a plurality of bus bar accommodation parts which accommodate and fix the bus bars and which are arranged in the longitudinal direction,
   wherein the resin plate is a structural member in the cable extra length absorbing structure according to claim 1, and wherein the resin plate is provided with the pair of cable clamps having the pair of cable holding portions disposed in the axis shift state in the cable extra length absorbing structure.

4. The cable extra length absorbing structure according to claim 1, wherein each of the pair of cable clamps includes the cable holding portion and a movable clamping portion, and wherein the movable clamping portion is movable away from the cable holding portion to an opened position and movable toward the cable holding portion to a closed position.

5. The cable extra length absorbing structure according to claim 1, wherein the center axis of the one holding portion deviates with respect to the center axis of the other holding portion by a predetermined linear dimension.

\* \* \* \* \*